Patented Feb. 19, 1935

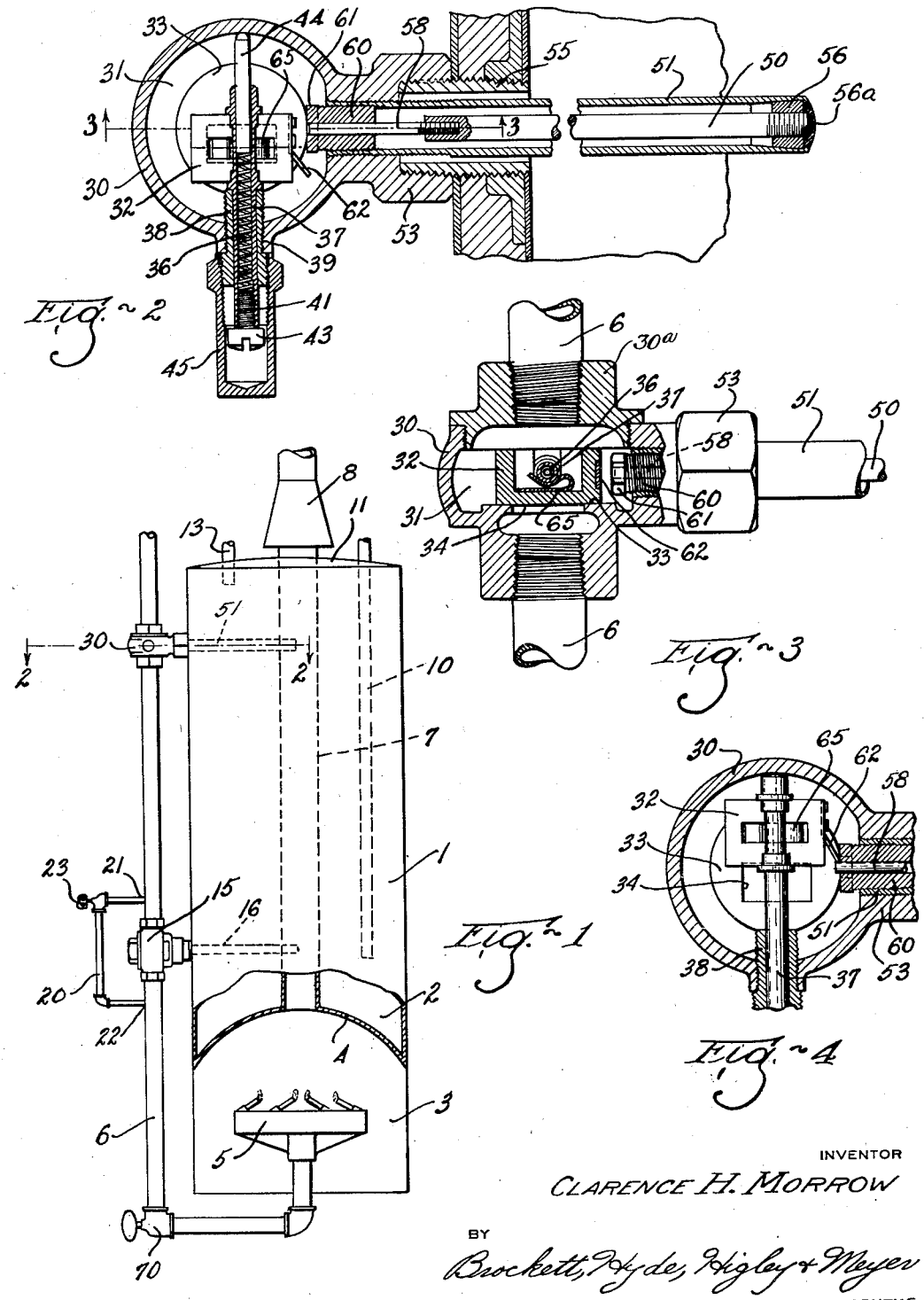

1,991,863

UNITED STATES PATENT OFFICE 1,991,863

THERMOSTATICALLY OPERATED EMERGENCY GAS SHUT-OFF VALVE FOR HOT WATER HEATERS

Clarence H. Morrow, Cleveland, Ohio, assignor to The Hotstream Heater Company, Cleveland, Ohio, a corporation of Ohio Application November 30, 1931, Serial No. 578,042

2 Claims. (Cl. 126—351)

This invention relates to improvements in hot water heaters, for domestic use or otherwise, and the general object of the present invention is to provide a hot water heater having a normally open, thermostatically closed emergency valve for automatically shutting off the flow of gas to the burner or burners of the heater upon the heating of the water of the heater to an abnormally high degree. The emergency valve of the present invention is adapted for use with heaters having either hand operated main valves or thermostatically operated main valves for normally controlling the flow of gas to the burner or burners of the heaters.

A more specific object of the present invention is to so locate the above mentioned emergency valve that, upon the heating of the water of the heater to an abnormally high temperature, it will automatically shut off the flow of gas for pilot light purposes as well as for water heating purposes.

Another more specific object of the present invention is to make the thermostatic means for closing the above mentioned emergency valve an adjustable means so that the automatic closing of said emergency valve can be effected upon the heating of the water of the heater to any selected, predetermined degree.

Another more specific object of the present invention is to make the above mentioned emergency valve and the operating means therefor of simple and inexpensive construction and of a form which enables them to be readily used with heaters now on the market as well as with new heaters.

Further objects of the invention will be obvious and others thereof will be pointed out as the description of the invention proceeds.

The invention will be readily understood from the following description of one embodiment thereof, reference being had to the accompanying drawing in which Fig. 1 is a side elevation of a simple form of domestic hot water heater embodying the present invention; Fig. 2 is a horizontal cross-sectional view thereof on the line 2—2, Fig. 1, and showing in detail the emergency gas shut-off valve and its operating means; Fig. 3 is a vertical sectional view of said emergency valve and its operating means, the view being on the line 3—3, Fig. 2; and Fig. 4 is a view similar to Fig. 2 but showing the emergency valve being held open.

The heater shown in Fig. 1 is of well known form and comprises a suitable insulated casing 1, vertically disposed and of generally cylindrical shape, said casing being provided with an upper, water-receiving and water-storing chamber 2 and a lower heating chamber 3, said chambers being separated by a suitable cross wall 4. Arranged within the heating chamber 3 is a suitable gas burner 5 having connected thereto a suitable gas supply line 6. For carrying away the products of combustion, a suitable flue pipe 7 extends vertically through the water-receiving and water-storing chamber 2, said pipe communicating at its lower end with the heating chamber 3 and communicating at its upper end with a suitable draft diverter 8. Preferably, the flue pipe 7 is arranged at one side of the central axis of the casing 1 in order that the thermostatic devices hereinafter described may project radially into the water-receiving and water-storing chamber 2. For supplying this chamber 2 with cold water to be heated, a suitable inlet pipe 10 is provided, said pipe extending through the top wall 11 of the casing 1 and terminating in the lower end portion of said chamber. To permit hot water to be withdrawn from said chamber 2, a suitable outlet pipe 13 is provided, said pipe also extending through the top wall 11 of the casing but terminating a short distance therebelow.

For normally controlling the flow of gas through the pipe line 6 to the burner 5, a suitable main valve 15 is provided, said valve being automatically operated by suitable thermostatic means 16 projecting radially into the lower end portion of the water-receiving and water-storing chamber 2. The function of this main valve 15 is, of course, to permit the flow of gas to the burner 5 when the temperature of the water within chamber 2 is lower than the predetermined, selected degree and to shut off the flow of gas to said burner when the temperature of said water has been raised to said selected degree. Inasmuch as the thermostatic means 16 for operating said valve is located within chamber 2, the valve 15 is quite sensitive to the temperature of the water in said chamber and is readily moved, automatically, of course, to either open or closed position, depending upon which is necessary to bring said water to or to maintain said water at the desired temperature, all as will be readily understood. Inasmuch as the main valve 15 and its thermostatic operating means 16 may be of any suitable construction, a number of well known forms being now in the market, and inasmuch as they form per se no part of the present invention, they are here illustrated more or less conventionally.

For pilot light purposes, means is provided for normally delivering a small quantity of gas to the burner 5 when the main valve 15 is closed. The means here shown comprises a small gas supply conduit 20 having its inlet end 21 communicating with the main gas supply line 6 ahead of the main valve 15 and its outlet end 22 communicating with the main gas supply line 6 below said main valve. For regulating the pilot light, a needle or other suitable valve 23 is provided in the pilot supply conduit 20, as shown. Inasmuch as this pilot supply conduit bypasses the main gas valve 15, a small quantity of gas is supplied to the burner 5 for pilot light purposes when the main gas valve 15 is closed.
The hot water heater so far described is of a construction that is well known in the art. It is usually referred to as an automatic heater, inasmuch as the heating of the water in the chamber 2 thereof is automatically controlled. As above mentioned, the main gas valve 15 opens and closes in response to the temperature of the water in chamber 2. When the temperature of the water in said chamber reaches the selected degree, the gas valve 15 is automatically closed and the supply of gas to burner 5 is shut off, except the small supply flowing through the bypass conduit 20 for pilot light purposes. Likewise, when the temperature of the water in said chamber falls below the desired degree, the valve 15 automatically opens the necessary amount to more or less rapidly bring the temperature of said water up to the desired degree.

It sometimes happens, however, that the main valve 15 fails to close upon the heating of the water in chamber 2 to the selected degree. Such failure may result because of something wrong with the valve itself or with its thermostatic operating mechanism 16, or because some foreign object has become lodged between the valve 15 and its seat, preventing said valve from closing. Whatever the reason, if the main valve 15 fails to close, a dangerous condition is brought about, which may result in the bursting of the casing 1 and the causing of considerable damage and perhaps personal injury.

To prevent the occurrence of such a dangerous condition, the present heater is provided with a normally open, thermostatically closed emergency gas shut-off valve, which automatically effects the closing of the main gas supply line 6 upon the heating of the water in chamber 2 to an abnormally high degree. Preferably, the thermostatic means for closing said emergency valve is adjustable, so that said valve can be made to close upon the heating of the water in chamber 2 to any predetermined selected degree. Although said thermostatic operating means can be located in any suitable place, it is preferably located within the top portion of the water-receiving and water-storing chamber 2, a location which gives said operating means maximum sensitivity.

In the embodiment of the invention here shown, a suitable valve casing 30 is connected in the gas supply line 6, ahead of the main valve 15 and the inlet end 21 of the pilot supply conduit 20. In the gas-receiving chamber 31 of this valve casing 30 is a suitable emergency slide valve 32, said valve having horizontal sliding movement over its seat 33 in which is located the gas outlet opening 34 controlled by said valve. A coiled spring 36 normally tends to slide said emergency valve 32 to closed position, as in Figs. 2 and 3, said spring being arranged within a horizontally disposed tubular plunger rod 37 having its inner end portion operatively connected to said valve by any suitable means and in any suitable manner, said rod being extended through the two side walls of said valve in the present embodiment of the invention. The outer end portion of the plunger rod 37 is slidably supported in a tubular bushing 38 threaded into or otherwise suitable arranged within a lateral opening 39 in the valve casing 30. In the outer end of said plunger rod is threaded a suitable adjusting screw 41 for the outer end of spring 36, said screw having an outer manipulating head 43. The inner end of spring 36 bears against one end of a horizontally disposed guide pin 44 over which is adapted to slide the inner end portion of the plunger rod 37, the other end of said pin being in engagement with the wall of the valve casing 30. To protect the outer exposed end portion of the plunger rod 37, and the adjusting screw 41 carried thereby, a suitable cap 45 is provided, said cap being threaded or otherwise suitably secured to the enlarged outer end of the bushing 38, as shown, or to the valve casing 30.

As before mentioned, the spring 36 normally urges the emergency valve 32 to slide to closed position with respect to the gas outlet opening 34, as in Figs. 2 and 3, and the function of the thermostatic means now to be described is to hold said valve open so long as the water in chamber 2 is not heated to an abnormally high degree, a degree so high that it is evident that the main valve 15 is not functioning properly. Upon the heating of the water in chamber 2 to such an abnormally high degree, the thermostatic means releases said valve and permits it to be closed by the spring 36.

The thermostatic means here shown for automatically closing the emergency valve 32 comprises a horizontally disposed, relatively non-expansible rod 50, of steel or the like, said rod being arranged within a correspondingly disposed thermostatic tube 51 of brass or some other suitable expansible material. Said tube has its inner end threaded or otherwise rigidly secured within a tubular extension 53 of the valve casing 30, said valve casing extension being secured to the heater casing 1 by a suitable tubular connector 55 surrounding but here shown as spaced from the thermostatic tube 51. The outer end of rod 50 is supported in a suitable brass plug 56, pressed into or otherwise rigidly secured in the outer end of the thermostatic tube 51, and in order to further rigidly interconnect the outer ends of rod 50 and thermostatic tube 51, solder 56ª or the like may be used.

Inasmuch as the inner end of the thermostatic tube 51 is rigidly secured to the valve casing extension 53, expansion of said tube caused by the heat of the water in chamber 2 will result in the outward movement of rod 50 connected to and therefore movable with said tube.

Threaded or otherwise rigidly connected to the inner end of rod 50 is a locking pin 58, said pin and said rod being interconnected in axial alignment, as clearly shown in Fig. 2. The inner end portion of the locking pin 58 is slidably supported in a suitable bushing 60 threaded or otherwise adjustably mounted in the inner end of the thermostatic tube 51, the outer headed end 61 of said bushing lying within the chamber 31 of the valve casing 30, where it is readily accessible by simply removing the cover 30ª of the valve casing 30.

Normally, the inner end of the locking pin 58 projects inwardly beyond the inner surface of the headed inner end 61 of the bushing 60, far enough inwardly that when the emergency valve is in open position, as in Fig. 4, said pin inner end lies ahead or in front of the free end of a spring finger 62 carried by the adjacent side of said valve. In other words, when the water in chamber 2 is at a temperature lower than the selected abnormally high temperature, the inner end of the locking pin 58 projects inwardly a sufficient extent to constitute a means for engaging the valve finger 62 and thereby holding said emergency valve open. The yieldability of the valve spring finger 62 permits said valve to be manually moved rearwardly to open position even with the locking pin 58 projecting inwardly its maximum extent, and when said valve finger passes the locking pin 58, said finger snaps behind said locking pin and closing movement of said valve is prevented until said locking pin is withdrawn by expansion of the thermostatic tube 51.

Such withdrawal of the locking pin 58 occurs when the water in chamber 2 is heated to the pre-selected, abnormally high temperature, such heating of said water causing such expansion of the thermostatic tube 51 that rod 50, and hence the locking pin 58 carried thereby, are moved outwardly. Such outward movement or withdrawal of the locking pin 58 releases the emergency valve 32 and permits said valve to be quickly moved to closing position, with respect to the gas outlet opening 34, by the spring 36. The emergency valve 32 will remain closed, of course, until it is again moved to open position by hand. To cause said valve to automatically remain open, the locking pin 58 must again project into the path of the valve finger 62 and such projection only occurs when the temperature of the water in chamber 2 is lower than the selected abnormally high degree, as will be readily understood. Therefore, so long as the water in chamber 2 remains at such abnormally high temperature, the emergency valve 32 cannot be held in open position by the locking pin 58.

Due to the adjustability of the bushing 60, the inner end of the locking pin 58 can be normally exposed any desired amount, so that closing of the emergency valve 32 can be effected upon the production of any selected abnormally high temperature, as will be readily understood.

If desired, and as shown, a suitable spring 65 may be provided between the plunger rod 37 and the emergency valve 32 for holding said valve down on its seat 33 with sufficient firmness.

As will be apparent, the closing of the emergency valve 32 shuts off all flow of gas to burner 5, both for heating purposes and for pilot light purposes. When once closed, the emergency valve can only be opened by hand, which naturally will be done, of course, only when the temperature of the water in chamber 2 has been reduced to a safe and proper degree.

Between the main valve 15 and the burner 5, the gas supply line 6 is preferably provided with a suitable hand valve 70, as is usual.

What I claim is:

1. A valve structure, comprising a casing having an inlet and an outlet, a cross wall in said casing provided with a port for establishing communication between said inlet and said outlet, a chambered valve slidable along said cross wall for cooperation with said port, manually operable means secured to said valve for sliding it to open position relative to said port, yielding means acting against said manually operable means normally urging said valve to slide to closing position relative to said port, means maintained in the chamber of said valve by said manually operable means for yieldingly maintaining said valve in engagement with said cross wall, and means for releasably maintaining said valve in open position relative to said port.

2. In combination, a water-containing receptacle, a burner for heating the water in said receptacle, a fuel supply conduit for said burner, a main valve in said conduit, thermostatic means in contact with and responsive to normal temperatures of the water in said receptacle for opening and closing said main valve to thereby control the flow of fuel through said conduit, an emergency valve in said conduit, means for releasably maintaining said emergency valve in open position, and thermostatic means in contact with and responsive to abnormally high temperature of the water in said receptacle for actuating said emergency valve, maintaining means to release said emergency valve when the temperature of said water reaches an abnormally high, dangerous degree, said emergency valve comprising a casing having a fuel inlet and a fuel outlet, a cross wall in said casing provided with a port for establishing communication between said inlet and said outlet, a chambered valve member slidable along said cross wall for cooperation with said port, manually operable means secured to said valve member for sliding it to open position relative to said port, yielding means acting against said manually operable means normally urging said valve member to slide to closing position relative to said port, and means maintained in the chamber of said valve member by said manually operable means for yieldingly maintaining said valve member in engagement with said cross wall.

CLARENCE H. MORROW.